United States Patent [19]

Mazza et al.

[11] Patent Number: 5,597,485
[45] Date of Patent: Jan. 28, 1997

[54] PROCESS FOR SEPARATING PROTEINS

[75] Inventors: Jorge A. Mazza; Pablo Outumuro, both of Buenos Aires, Argentina

[73] Assignee: Vilmax S.A., Buenos Aires

[21] Appl. No.: 365,068

[22] Filed: Dec. 27, 1994

Related U.S. Application Data

[63] Continuation of Ser. No. 938,015, Aug. 28, 1992, abandoned, which is a continuation-in-part of Ser. No. 349,694, May 10, 1989, abandoned.

[30] Foreign Application Priority Data

May 13, 1988 [AR]  Argentina ................... 310844

[51] Int. Cl.$^6$ .................................. B01D 15/08
[52] U.S. Cl. .............. 210/635; 210/656; 210/198.2; 530/413; 530/417
[58] Field of Search .................. 210/198.2, 635, 210/656; 530/413, 417

[56]  References Cited

U.S. PATENT DOCUMENTS

| | | | |
|---|---|---|---|
| 3,904,557 | 9/1975 | Guthrie | 264/73 |
| 3,957,741 | 5/1976 | Rembaum | 526/312 |
| 4,016,133 | 4/1977 | Hyosu et al. | 260/42.21 |
| 4,166,105 | 8/1979 | Hirschfeld | 424/8 |
| 4,278,661 | 7/1981 | Knight, Jr. | 424/85 |
| 4,339,500 | 7/1982 | Yanagihara | 428/402 |
| 4,385,991 | 5/1983 | Rosevear et al. | 210/635 |
| 4,413,070 | 11/1983 | Rembaum | 523/223 |
| 4,416,783 | 11/1983 | Noguchi | 210/635 |
| 4,431,546 | 2/1984 | Hughes et al. | 210/656 |
| 4,451,487 | 5/1984 | Vetter et al. | 435/183 |
| 4,452,886 | 6/1984 | Henry | 435/7 |
| 4,541,952 | 9/1985 | Hosoi et al. | 424/85 |
| 4,546,161 | 10/1985 | Harvey et al. | 527/312 |
| 4,579,661 | 4/1986 | Gustafsson et al. | 210/635 |
| 4,622,362 | 11/1986 | Rembaum | 525/54.1 |
| 4,678,814 | 7/1987 | Rembaum | 522/175 |
| 4,740,306 | 4/1988 | Litwack | 210/198.2 |
| 4,795,794 | 1/1989 | Winnik et al. | 526/259 |
| 5,030,697 | 7/1991 | Hugl | 525/326.9 |

FOREIGN PATENT DOCUMENTS

| | | | |
|---|---|---|---|
| 0027262 | 10/1980 | European Pat. Off. | 210/198.2 |
| 0183198 | 6/1986 | European Pat. Off. | 210/198.2 |
| 0209284 | 1/1987 | European Pat. Off. | 210/198.2 |
| 3244006 | 5/1984 | Germany | 210/198.2 |
| 979364 | 12/1982 | U.S.S.R. | 210/198.2 |
| 1168564 | 7/1985 | U.S.S.R. | 210/198.2 |
| 2053926 | 7/1980 | United Kingdom | 210/198.2 |
| 84/04309 | 11/1984 | WIPO | 210/198.2 |

OTHER PUBLICATIONS

Hey et al., *Chem. and Ind.*, 726–732 (Oct. 17, 1981).
Parikh et al., *Chem. and Eng. News*, 17–32 (Aug. 26, 1985).

*Primary Examiner*—Ernest G. Therkorn
*Attorney, Agent, or Firm*—Scully, Scott, Murphy & Presser

[57] ABSTRACT

Disclosed is a process of separating protein using a polymeric composition. The composition includes a polymer formed from at least one monomer containing a polymerizable moiety chemically bonded to an anionic organic dye. The dye has an affinity for the protein to be separated. The process includes retaining the protein on the dye fraction and recovering the protein from the polymer.

15 Claims, No Drawings

PROCESS FOR SEPARATING PROTEINS

This is a continuation of U.S. patent application Ser. No. 07/938,015 filed on Aug. 28, 1992 which is a continuation-in-part application of U.S. patent application Ser. No. 07/349,694 filed on May 10, 1989, both now abandoned.

BACKGROUND OF THE INVENTION

The extraction, concentration and purification of biologically active substances (enzymes, antibodies, hormones, DNA or RNA fragments, and the like) is one of the fundamental problems in biotechnology. The discovery and synthesis of this class of substances, which generally occur with various proportions of other substances present as impurities, has stimulated the search for and development of new techniques and the improvement of known techniques with the object of achieving greater specificity and, where possible, with the greatest economy of time and resources.

These problems of preparative and fractionation techniques, especially as regards the quality (purity) of the products or isolated fractions, take on a special meaning in the case of materials or proteinaceous fractions [sic], commonly composed of various proteins having similar characteristics, often difficult to resolve, as in the case of the fractionation of organ extracts or lysates.

Moreover, this requirement, insofar as it relates to the purity of the biologically active substances and fractions, which is necessary in research work, becomes essential where medicinal products are concerned, as in the case of interferon, insulin, monoclonal antibodies, and the like.

The need to have methods of ever-increasing selectivity has led to the development of other techniques of varying complexity, for example the widely diversified chromatographic techniques such as pawl [sic], high pressure and thin-layer chromatography and, more recently, molecular exclusion chromatography and affinity chromatography, combined in practice with other techniques based on other principles, such as electrophoresis, dialysis, and the like.

Molecular exclusion chromatography is based on the size and/or geometry of the solute or to isolate [sic] or purified, while ion exchange chromatography is based on the coulombic interaction between the substrate and the solute and the acid/base properties of the solute.

For the purposes of the present invention, it is appropriate to stop and consider this chromatographic variant known as "affinity chromatography" (Hay and Dean; Chem. and Ind. 1981; p. 726), based on specific non-covalent interactions between the substance of interest and a suitable reactant immobilized on a suitable substrate (also known as matrix), an interaction which obviously does not take place with the other components (or impurities) present in the sample. In distinction to the other components, the substance of interest remains bound or immobilized on the substrate. This occurs, for example, with certain enzymes (in the sample) which bind strongly but reversibly to specific coenzymes, or an antibody binds to and becomes immobilized with the specific antigen (or vice versa). The next steps are obvious: the combination or complex of substance of interest with the substrate may be processed once separated from the unbound components of the sample, the complex is subsequently split and the substance of interest is recovered, naturally with a higher degree of purity.

This property is exploited for isolating one enzyme from others (or from other solutes) by making use of affinity chromatography, binding the specific coenzyme or the cofactors (AND, AMP) for the enzyme to be separated or purified covalently to a suitable functional group located at the surface of the particles which make up the support of the chromatographic column ("spacer arms"), and then eluting with a solution of the free ligand (coenzyme). The same principle underlies the application of other bonding species such as inhibitors, antigens, antibodies, lectins, and the like.

As a support material, certain polysaccharides such as agarose and dextrans (for example the commercial products known as Sepharose or Sephadex, and the like), or polyacrylates (for example the commercial products known as Bio-Gel, Trisacryl, Ultrogel, and the like), are commonly used. The support material is usually activated, before the operation of binding the chosen ligand, with cyanogen bromide, for example. The largest possible activator/support ratio is generally applied, with the object of achieving a high binding capacity in the chromatographic column.

Recently, the resolving power of affinity chromatography columns has been improved through the application of "spacer arms", designed to compensate for the steric hindrance features resulting from the size and geometry of biologically active molecules of interest. Said spacer arms (aliphatic groups such as, for example, polymethylene chains of 1 to 10 carbon atoms) are pendant groups which project from the surface of the particles of the support, at the free end of which the ligand groups are bound (Low, C. R: Topics in Enzyme and Fermentation Biotechnology, 5a. ed, Wiseman, A: Ellis Horwood, Chichester, 1981, chap. 2).

The resolving power of affinity chromatography has undergone an unexpected improvement as a result of the discovery of a clear affinity between dyes and biologically active molecules, especially proteins, which has led to the fractionation of these biologically active molecules by affinity chromatography, supports and/or colored matrices being employed, as disclosed, for example, in:

Eur. Pat. Sol. EP 183198 (Asahi Chemical Ind. Co. Ltd.)
PCT Int. Sol. WO 84/4309 (Pharmacia AB)
Eur. Pat. Sol. EP 27262 (Dupont de Nemours E.I. and Co.)
USSR SU 1168564 (All Union Scientific Research Inst. of applied Microbiology)

There have been developed, in addition, other methods of this type (affinity chromatography) for the purification of proteins making use of more complicated processes, such as the use of two dyes, one immobilized on the matrix and the other present in the elution fluid (Ger Offen. DE 3244006), an immobilized carrier coupled to a blue dye (Affi-gel Blue) with a residue chelated with a metal (Eur. Pat. Appl. E.P. 94672 A1) or the formation of two phases by addition to the biological fluid of a Cibacron Blue-Sepharose 68 [sic]/PEG 4000 complex, with a suitable buffer (PCT INT. WO 84/4309 A1).

Methods for purifying proteins solely of high molecular weight (British Patent 2053926) are also known.

Thus, the affinity of certain dyes, and of certain matrices with dye bound to them, for substances with biological activity, including proteins, peptides, hormones, enzymes, growth and transforming factors, nucleic acids and nucleotides, has been disclosed in the prior art. This affinity has been applied for the fractionation, purification, and the like, of these substances, employing columns or matrices in which the dye molecules are bound to a colorless original matrix (formed from agarose, dextrans, polyacrylates, and the like, and combinations and variants thereof), either directly or with the interposing of "spacer arms" (Lowe op. cit.). These spacer arms permit greater steric freedom in proximity to the ligand.

In addition, the preparation and application of colored polymers, composed of finely divided or micronized pigments dispersed in a polymer matrix, for industry for purely decorative purposes, in the textile industry, packaging, and the like, covering the whole range of colors of the visible spectrum, have also been disclosed in the prior art; this includes the use of fluorescent dyes, according to a recent disclosure in U.S. Pat. No. 4,016,133 of Ilyoshu et al. An important innovation in the art of preparing colored polymers has been provided by the application of conventional techniques in the polymerization of colorless prepolymers with monomers carrying at least one covalently bound chromophor group. This hence gives rise to permanently colored polymers in which the chromophor group or structure is covalently bound to the hydro-carbon skeleton of the polymer; such is the case with the polymers obtained by Winnik et al. U.S. Pat. No. 4,795,794, which deals with the dispersion polymerization of colorless vinyl monomers and vinyl monomers covalently bound to a dye. As disclosed by Winnik et al., this class of colored polymers are [sic] especially useful for the development of images in electrographic printing processes (colored toner particles).

DISCLOSURE OF THE INVENTION

It has now been found possible to combine a) the disclosures of the prior art in relation to colored polymers formed by copolymerization of colorless monomers or prepolymers and colored monomers (see above), and b) the affinity of certain chromophors for proteins in general and for bioactive proteins (such as enzymes, antibodies and hormones) in particular, and to design and develop a new composition of matter which is useful for separating substances having affinity for specific dyes which form part of a polymeric structure.

Chromophor is understood to mean a chemical structure bearing color, and this is the sense in which it will be used in this invention.

The chromophor is supplied by a synthetic organic dye of the anionic type, in particular those belonging to the group of reactive, acid and/or direct dyes. These chromophors are of the azo, anthraquinone, formazan, dioxazine and/or phthalocyanine type, and are generally modified, especially by the introduction of polymerizable groups and/or spacer arms.

As examples of modified chromophors or dyes, the following may be mentioned:

I   II   III   IV
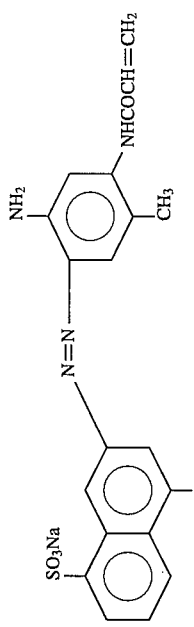
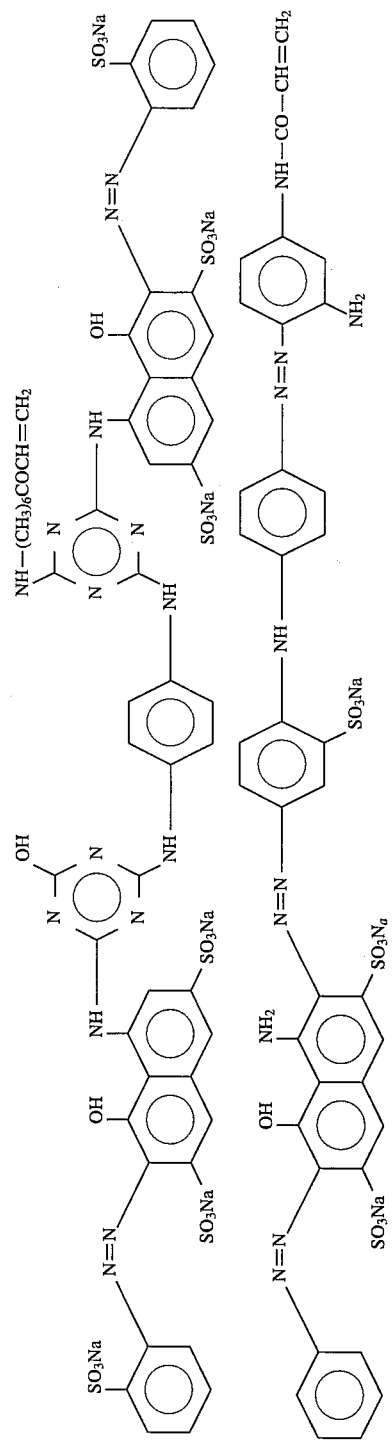
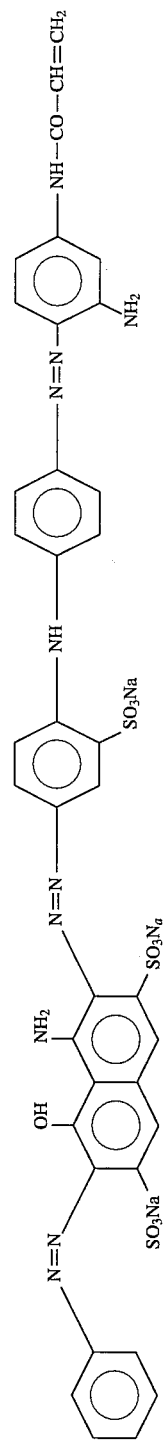

V
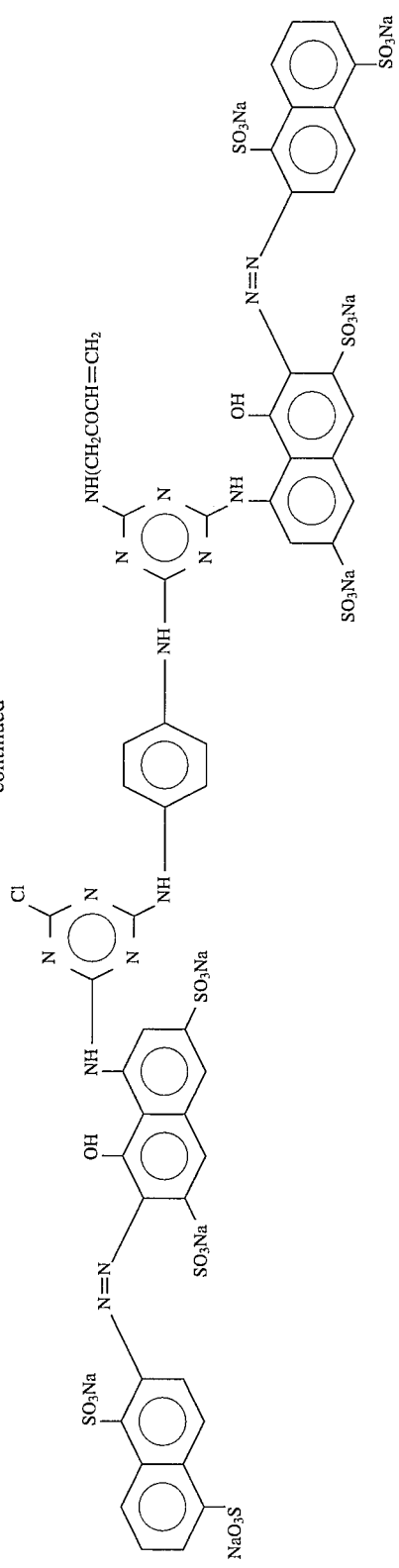
VI
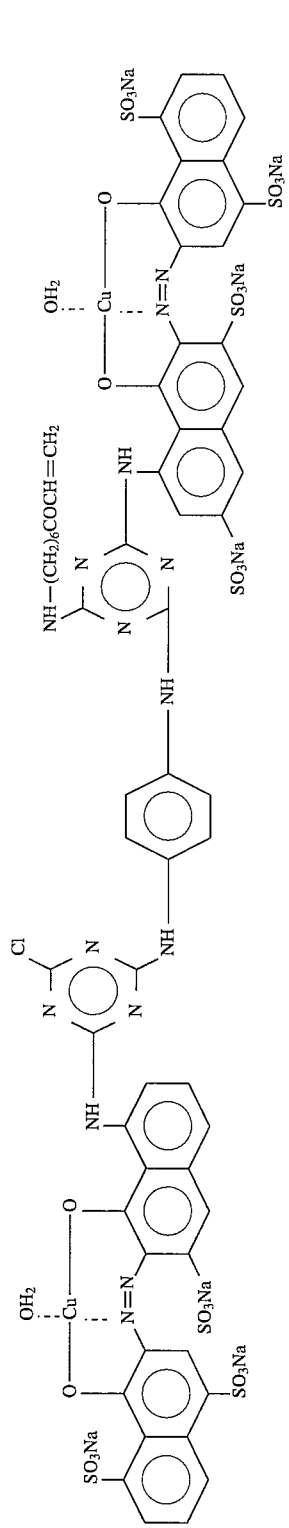
VII
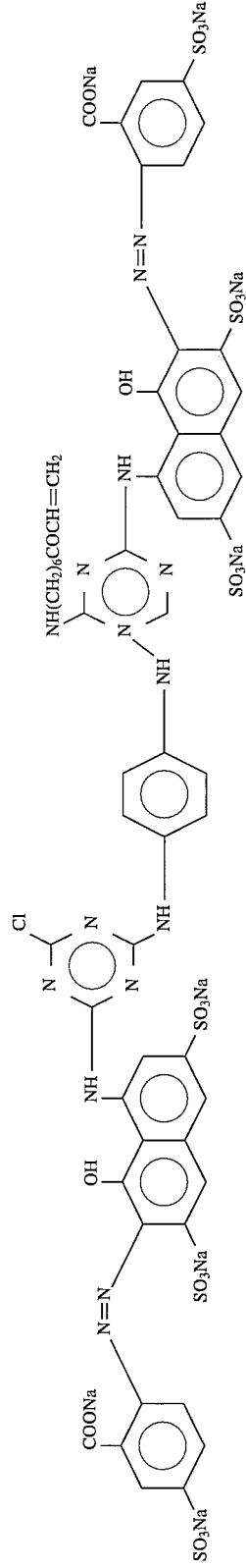

Consequently, a subject of the present invention is the provision of a composition of matter for use in the specific separation of proteins by affinity mechanisms, including affinity chromatography, which comprises a polymer in which a chromophor with affinity for the proteins to be separated forms part of the molecules.

A further subject of the present invention is the fact that the polymer is a synthetic polymer of a monomer carrying a chromophor with affinity for the proteins to be separated, said chromophor being a dye modified by the introduction of polymerizable or copolymerizable groups. Moreover, the content of the modified chromophor is not less than 0.1% by weight.

Yet a further subject consists of the feature that the modification of the chromophor includes the presence of spacer arms, in particular ($C_1$–$C_6$) alkyl chains.

Yet a further subject consists of the feature that the copolymer is formed from a colored monomer and a colorless monomer, the latter being a vinyl monomer chosen from the group comprising vinyl acetate, divinylbenzene, styrene, acrylic acid, methacrylic acid, methacrylamide and the amides N-[2-hydroxy-1,1-bis(hydroxymethyl)ethyl]-2-propenamide and N,N'-methylenebis(2-propenamide).

Yet a further subject consists of the feature that the degree of crosslinking of the copolymer has been regulated during its synthesis so as to obtain the pore size and other appropriate properties for the binding of the proteins of interest.

Yet a further subject of the present invention consists of the feature that the chromophor is supplied by a synthetic organic dye of the anionic type, in particular those chosen from the group composed of reactive dyes, acid dyes and direct dyes, these chromophors being chosen from the group comprising azo, anthraquinone, formazan, dioxazine and phthalocyanine dyes modified by the introduction of polymerizable and copolymerizable groups.

Yet a further subject of the present invention consists of a method for preparing the composition of matter for use in the specific separation of proteins, which comprises the polymerization of at least one monomer of which a chromophor with affinity for the proteins to be separated forms part.

In an embodiment of said method, the polymerization of at least two monomers, each of which contains a chromophor with affinity for the proteins to be separated, has been envisaged, said chromophors being different from one another.

Yet a further subject consists of the feature that each chromophor is supplied by a synthetic organic dye of the anionic type, in particular those chosen from the group composed of reactive dyes, acid dyes and direct dyes, these chromophors being chosen from the group comprising azo, anthraquinone, formazan, dioxazine and phthalocyanine dyes modified by the introduction of polymerizable and copolymerizable groups.

Another additional subject of the present invention is a method for separating proteins for [sic] the composition of matter referred to above, which comprises bringing the material carrying the protein to be separated in solution into contact with said composition of matter in divided or granular form, eluting the substances selectively retained by said component and recovering the appropriate fractions.

In a special case of said method, the composition of matter is the contents Of an affinity chromatography column.

A further subject of the method described above is the mixing of said composition in divided or granular form under conditions which ensure intimate contact between said composition of matter in divided or granular form and the material carrying the proteins to be separated in solution, and then the separation by filtration, decantation or centrifugation of the divided material loaded with the proteins retained by affinity by the dye fraction bound to the polymer.

Yet a further subject of the method for separating proteins with the abovementioned composition of matter is the fact that at least one of the proteins of interest to be separated is present in a small proportion compared to the other components of the mixture.

DETAILED DESCRIPTION OF THE INVENTION

The notion of monomers embraces all known polymerizable substances, such as vinyl monomers (vinyl acetate, divinylbenzene, styrene, and the like), acrylic monomers (acrylic or methacrylic acid and their alkyl esters, acrylamides, especially N-substituted acrylamides such as N-[2-hydroxy-1,1-bis (hydroxymethyl)ethyl ]-2-propenamide (CAS RN 13880-05-2) and N,N'-methylenebis(2-propenamide) (CAS RN 110-26-9)) and all other known monomers.

It will be understood from the foregoing description that, in the colored monomer, the dye or dye derivative is linked to the colorless monomer either directly, or via "spacer arms" or some other chemical groups. These "spacer arms" and other chemical groups may also be present at other positions in the molecule of the colored monomer, or else be incorporated in the colored monomers during the polymerization of same.

For the polymerization, a single colored monomer or alternatively more than one of these may be employed, either alone or accompanied by any other class of products, such as, for example, traditional colorless monomers, substances capable of producing spacer arms or any chemical substance in general.

The final product (colored polymer) can, in turn, be used alone or alternatively mixed, combined or diluted with other products (matrices), with chemical substances or with inert or activating materials, with the sole condition that their concentration is not less than 0.1% of the total of the mixture or with combination [sic].

The colored polymers for application in the present invention do not depend on the technique applied in the polymerization of the monomers. The choice of polymerization method obviously depends on the monomers chosen: emulsion polymerization, solution polymerization (in an aqueous or organic phase), condensation polymerization, random or block polymerization, and the like, with the appropriate catalyst and initiators in each case. The polymerization method also depends essentially on the properties desired in the matrix to be obtained: porosity, rigidity, and the like.

A preferred aspect of the present invention relates to colored polymers composed of acrylic monomers and of the modified chromophors shown above in the formulae I to I [sic] to VII. These monomers are polymerized either alone or in the presence of other colored or colorless monomers, bound directly or by means of spacer arms, as indicated previously.

Reactive Blue 2 is a dye which corresponds to the formula

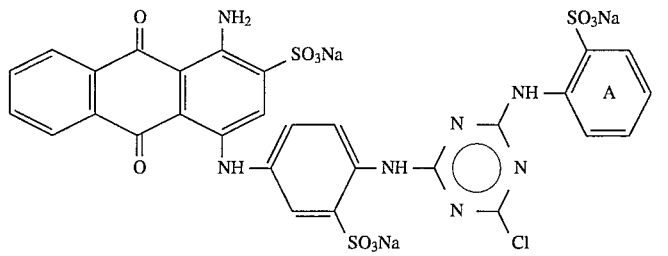

(A)

It should be pointed out in this connection that the accepted conventional formula for this dye corresponds to a mixture of isomers, with the sulfonic group of the ring A at the meta and para position. It is now recognized that the dye actually corresponds to the structure shown in the above formula, namely with the sulfonic group at the ortho position. Nevertheless, "Reactive Blue 2" is normally used to designate any one of these isomers and mixtures thereof, a nomenclature which we are adopting in this patent.

Reactive Red 120, for its part, is an azo dye which includes two reactive triazine groups in its molecule, according to the following formula:

insulin (human, bovine, porcine)

growth factors (such as growth hormone-releasing factor (GRF), such as GRF-29, GRF-37, GRF-47; epidermal growth factor, GEF, and the like)

interleukins cytokines interferons albumins (human or animal)

luteinizing hormone follicle-stimulating hormone globulins and immunoglobulins

The examples which follow are given as an illustration and for the sole purpose of showing how the present invention may be put into practice.

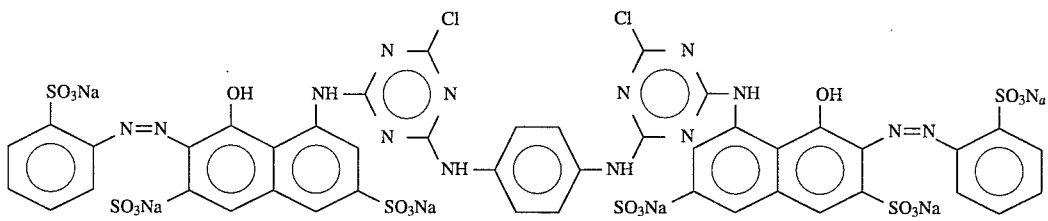

(B)

The separation, purification, and the like, of substances according to the method of the present invention, that is to say, using polymers which have groups originating from dyes bound to the chain or structure of the polymer, may be carried out by means of affinity columns packed with said colored polymers in the form of granules, beads or porous articles, according to common practice in affinity chromatography techniques. However, the method of the present invention admits of other variants: it is possible, for example, to dispense with chromatographic columns, bringing the divided colored polymer and the solution which contains the protein to be extracted, purified, concentrated, and the like, into contact (for example in a precipitating jar) under conditions which ensure intimate and permanent contact between said particles and said solution, for example by mechanical or sonic agitation, and the like, for a specified period of time, and then to separate the colored particles from the solution by filtration, centrifugation, and the like.

The composition of matter according to the present invention finds application for purifying or isolating proteins such as:

EXAMPLE 1
SYNTHESIS OF A COLORED MONOMER DERIVED FROM REACTIVE RED 120
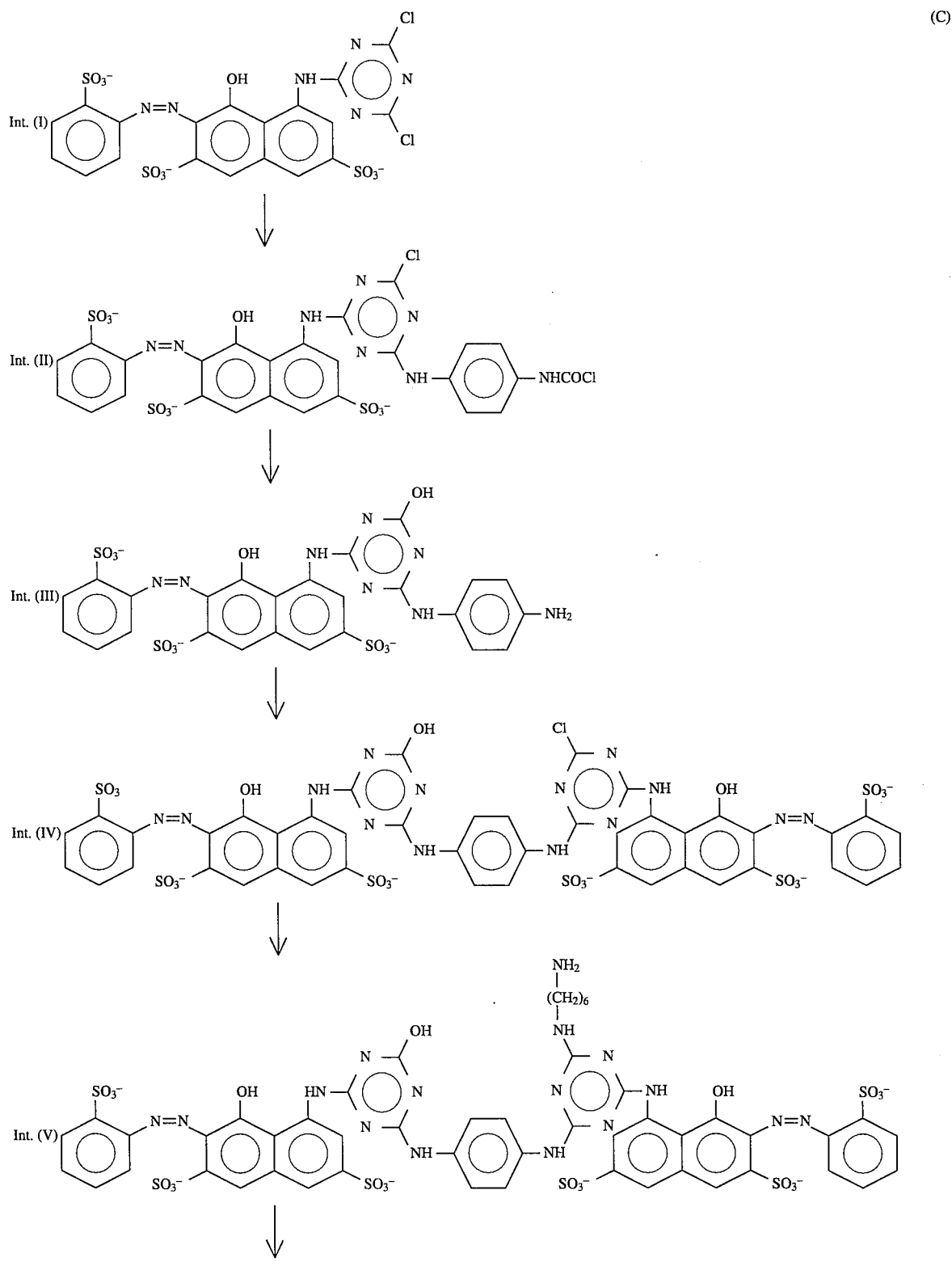
(C)

-continued

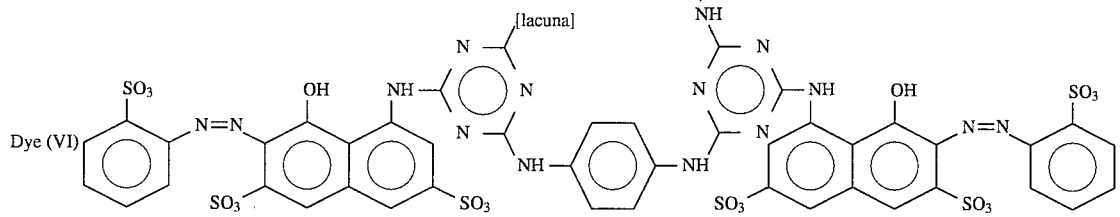

The starting material for the preparation is the intermediate (I), the procedure being in accordance with the following sequence:

A. SYNTHESIS OF THE INTERMEDIATE (II)

0.22 mol of p-aminoacetanilide in the form of a finely divided powder is added with mechanical stirring and at room temperature to a solution of 0.2 mol of the intermediate (I) dissolved in 2,500 ml of water. The pH is maintained at 7 by adding 20% sodium carbonate solution over a period of one hour. The temperature is then raised to 40 degrees C, mechanical stirring being maintained and the pH being continuously adjusted to 7 in the manner described.

Completion of the reaction is verified by establishing the absence of intermediate (I) by paper chromatography.

B. SYNTHESIS OF THE INTERMEDIATE (III)

Concentrated aqueous sodiumhydroxide solution is added to the above solution of the intermediate (II) until the pH is 13, and the mixture is heated to 95° C. and maintained at this temperature for one hour. Completion of the reaction is determined by thin-layer chromatography on silica gel, the absence of the intermediate (II) being established.

The intermediate (III) is isolated by adjusting the pH to 7, cooling the solution to 5°–10° C. and filtering. The filter cake obtained contains the intermediate (III) at a good level of purity, and is consequently dried directly in an oven at 75° C.

C. SYNTHESIS OF THE INTERMEDIATE (IV)

0.2 mol of the intermediate (III) in the form of finely divided powder is added to a solution containing 0.2 mol of the intermediate (I) in 2,500 ml of water. The mixture is heated to 50°–60° C. and the pH is maintained at 7 by the gradual addition of a 20% solution of sodium carbonate in water.

When the reaction is complete, the pH remains stabilized. The absence of the two free intermediates (I) and (III) is then verified by thin-layer chromatography on silica gel. The product obtained is used directly in the next step.

D. SYNTHESIS OF THE INTERMEDIATE (V)

1 mol of hexamethylenediamine and 0.2 mol of pyridine are added to the above solution of the intermediate (IV). The mixture is heated to 80° C. for one hour, and the absence of intermediate (IV) is verified by thin-layer chromatography on silica gel.

The intermediate obtained is isolated by adjusting the pH to 7, cooling to 5°–10° C. and filtering. The filter cake contains the intermediate (V) at a good level of purity, and is consequently dried directly in an oven at 75° C.

E. PRODUCTION OF TOSYL ACRYLIC ANHYDRIDE [SIC]

Solutions in dimethylformamide of potassium acrylate (or lithium acrylate, sodium acrylate or ammonium acrylate) and tosyl chloride are prepared and mixed at room temperature in equimolar proportions of their solutes. A solution of tosyl acrylic anhydride [sic] is obtained directly.

It is also possible to start from solutions in dimethylformamide of potassium tosylate (or lithium tosylate, sodium tosylate or ammonium tosylate) and acryloyl chloride, which are mixed in equimolar proportions of their solutes.

F. SYNTHESIS OF THE COLORED MONOMER (VI)

A solution of 0.2 mol of the intermediate (V) in 2,500 ml of water is prepared and brought to pH 9.5 by adding a sufficient quantity of triethylamine. It is cooled to 0°–5° C.

The solution in dimethylformamide of tosyl acrylic anhydride [sic] obtained in step E is added dropwise to this solution. The pH is maintained continuously at 9–9.5 by adding more triethylamine if necessary. The addition of tosyl acrylic anhydride [sic] solution is considered to be complete when a thin-layer check on the reaction shows the intermediate (V) to be absent in the original solution.

The isolation of the product (VI) is carried out by adjusting the pH to 5 with acetic acid, adding 5% of potassium chloride and centrifuging the solution.

The sediment obtained is washed twice by centrifugation in the presence of acetone, and dried under vacuum and at room temperature.

The product obtained is one of the colored monomers, and the polymers of which it forms part constitute the composition of the present invention.

EXAMPLES 2–4

Using a technique similar to that of Example 1, the following dyes are prepared:

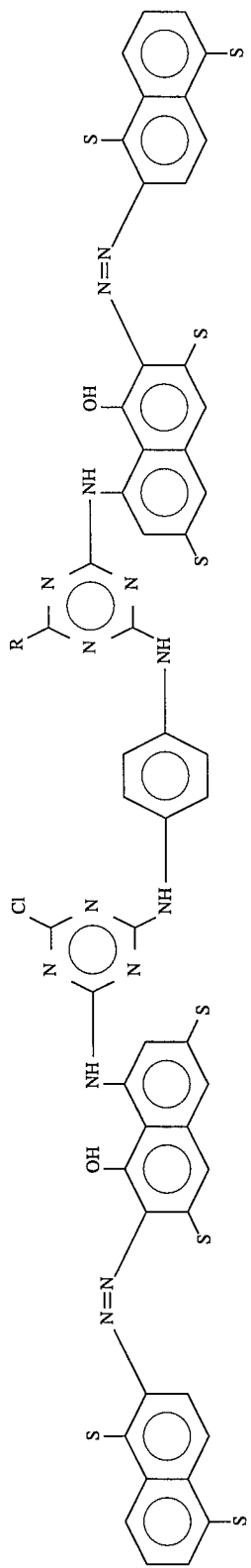
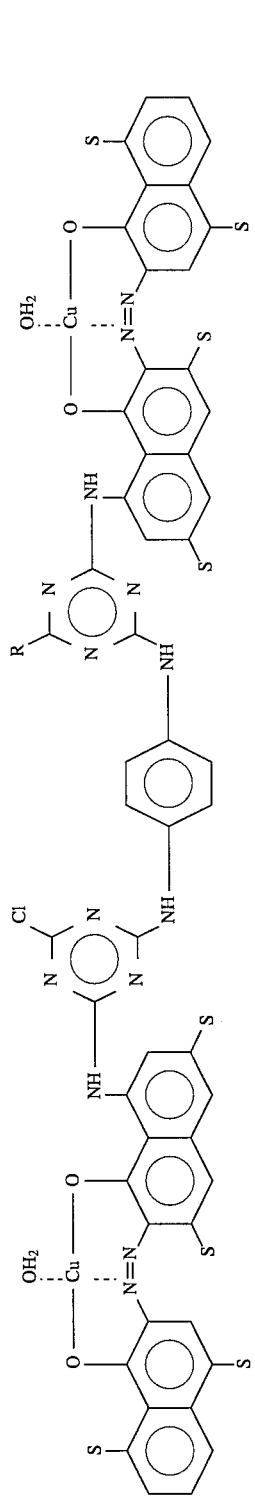
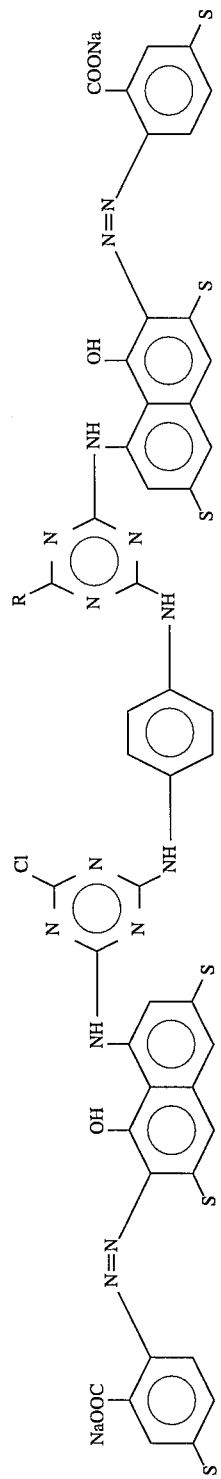

EXAMPLE 5

SYNTHESIS OF A COLORED MONOMER DERIVED FROM REACTIVE BLUE 2

400 mg of Reactive Blue 2 dye (A) are dissolved in 10 ml of dimethylformamide at 40° C. 270 mg of hexamethylenediamine and 40 mg of pyridine are added, the mixture is heated to 75° C. and this temperature is maintained for 4 to 6 hours.

0.5–0.8 ml of 10N HCl is now added until the mixture comes to pH 2. The mixture is stirred for 10 minutes and 9 g of NaCl dissolved in 40 ml of distilled water are then added. The dye precipitates and is filtered off.

The filter cake is resuspended in distilled water at 70° C. and the suspension is brought to pH 2, whereby the remainder of the hexamethylenediamine is removed. The suspension is filtered again. The intermediate obtained is dried at 70°–80° C. This intermediate is dissolved in 10 ml of dimethylformamide with the addition of 3 ml of triethylamine, the temperature is adjusted to 30° C. and 100 mg of acryloyl chloride are added, the mixture then being stirred for 2 hours. When the acrylation [sic] of the intermediate is complete, 35 ml of saturated NaCl solution are added and the mixture is stirred for 15 minutes. 3.5 ml of 10 N HCl are then added and the mixture is stirred for 15 minutes. The product obtained is filtered off and dried at 50° C. A blue colored monomer which corresponds to what is claimed in this invention is thereby obtained.

Note: The same colored monomer may be obtained from the intermediate mentioned above, which is reacted with tosyl acrylic anhydride [sic] according to the conditions established in point F of Example 1.

EXAMPLE 6

PREPARATION OF A COLORED MATRIX 400 mg of the colored monomer prepared according to Example 1 are dissolved in 10 ml of distilled water at 20° C. 873 mg of N-[2-hydroxy-1,1-bis(hydroxymethyl)-ethyl]-2-propenamide (CAS RN 13880-05-2) and 27 mg of N,N'-methylenebis(2-propenamide) (CAS RN 110-26-9) are added to this solution.

When complete dissolution has been obtained, 0.25 ml of 10% w/w ammonium persulfate solution is added and polymerization is allowed to proceed naturally, working at a temperature of between 0° and 50° C. When the polymerization is complete, the substance obtained is taken up with distilled water, with NaCl and finally with an aqueous-alcoholic mixture. The three-dimensional matrix thereby obtained is insoluble in water, has a porous form and contains not less than 10 mg of dye per ml of matrix.

Example 7–10: Preparation of several colored matrices with the technique of Example 6; the following matrices are prepared:
Example 7: From the colored monomer of Example 2.
Example 8: From the colored monomer of Example 3.
Example 9: From the colored monomer of Example 4.
Example 10: From the colored monomer of Example 5.

Polymers which contain not less than 10 mg of dye per ml of matrix are obtained.

EXAMPLE 11

BINDING OF HUMAN ALBUMIN BY A COLORED MATRIX

A chromatographic column is packed with the colored matrix obtained in Example 6. A solution of 400 ml of human albumin in 10 ml of distilled water is passed through it. When the binding of protein is complete, the column is washed with distilled water to remove unbound albumin. The colored matrix is extracted from the column and the bound albumin is separated from the actual matrix. The quantity of albumin bound is determined, it being found that 25 mg have been bound per ml of matrix.

The preparation of the chromatographic column, the introduction of the fluid to be purified, separation of the protein absorbed from the colored matrix and its subsequent assay are carried out by applying the techniques and methods customary in this field (see, for example, "Affinity Chromatography" Indu Parkh and Pedro Cuastrecasas, Chemical and Engineering News, Vol. 63, Aug. 26, 1985, pp. 17–32; or alternatively "Affinity Chromatography" by Lowe C. R. and Dean P. D. G., Wiley-Interscience, London, 1974; or alternatively "Reactive dyes in protein and enzyme technology" by Clonis Y. D., Atkinson T., Bruton C. J. and Lowe C. R., The Macmillan Press Ltd., London, 1987).

COMPARATIVE EXAMPLE A

BINDING OF HUMAN ALBUMIN BY A TRADITIONAL COLORED MATRIX

A colored matrix having almost the same composition as the one obtained in Example 6 is prepared by a traditional method. For this purpose, the starting material is a matrix consisting of an acrylic polymer such as, for example, Trisacryl GF manufactured by the company IBF of France. The binding of Reactive Red 120 to this colorless matrix is carried out according to the method recommended by the manufacturer of the colorless matrix.

A matrix is obtained which, like the one prepared in Example 6, contains 10 mg of dye per ml of matrix. The pore size and other characteristics of this polymer are also very similar to those possessed by the matrix obtained in Example 6.

The basic difference between the two matrices is specifically the fact that the one corresponding to Example 6 has been prepared according to the present invention. The matrix of this comparative example is a traditional colored matrix, obtained by the binding of a dye to a colorless matrix or polymer.

The binding of human albumin to this traditional colored matrix is now carried out, repeating exactly the method used in Example No. 11. The quantity of albumin bound is determined, it being found that 3 mg have been bound per ml of matrix.

This result, greatly inferior to that obtained in the previous example, shows the efficiency of the new colored matrices for binding proteins.

EXAMPLE 12

BINDING OF HUMAN ALBUMIN BY A BLUE COLORED MATRIX

With the matrix obtained according to Example 10, the procedure described in Example 11 is followed. It is found finally that 34.1 mg of human albumin have been bound per ml of matrix.

COMPARATIVE EXAMPLE B

BINDING OF HUMAN ALBUMIN BY A BLUE COLORED MATRIX

A colored matrix having almost the same composition as the one obtained in Example 10 is prepared by a traditional method. For this purpose, the starting material is a matrix consisting of an acrylic polymer such as, for example, Trisacryl GF manufactured by the company IBF of France. The binding of Reactive Blue 2 to this colorless matrix is carried out according to the method recommended by the manufacturer of the colorless matrix.

A matrix is obtained which, like the one prepared according to Example 10, contains approximately 11 mg of dye per ml of matrix. The pore size and other characteristics of this polymer are also very similar to those possessed by the matrix obtained in Example 10.

The binding of human albumin to this matrix is now carried out, repeating exactly the method used in Example 11. The quantity of albumin bound is determined, only 8 mg of albumin per ml of matrix being found.

This result, greatly inferior to that obtained in Example 12, shows once again the efficiency of the new colored matrices for binding substances having biological activity. Examples 13–20: Following the method of Examples 11 and 12, separations of various proteins of interest, previously diluted with 100 times their weight of BSA, were carried out.

| Ex. | PROTEIN | MATRIX | % BOUND | % FLUID [sic] | % REM.[1] |
|---|---|---|---|---|---|
| 13 | Insulin | Ex. 6 | 90 | 80 | 77 |
| 14 | EGF | Ex. 6 | 91 | 90 | 72 |
| 15 | EGF | Ex. 7 | 88 | 85 | 76 |
| 16 | hTGF -α1 | Ex. 7 | 96 | 100 | 65 |
| 17 | hTGF -α1 | Ex. 8 | 90 | 100 | 63 |
| 18 | hTGF -α1 | Ex. 9 | 88 | 100 | 58 |
| 19 | Interleukin-1 | Ex. 6 | 84 | 100 | 75 |
| 20 | rL-IFN 2a | Ex. 6 | 92 | 69 | 90 |

[1]Percentage removal of proteins present as impurities.

We claim:

1. A process of separating proteins comprising
   contacting a material containing at least one protein to be separated therefrom with a polymeric composition comprising a polymer formed from at least one monomer containing a polymerizable moiety chemically bonded to an organic dye of the anionic type, said dye having affinity for said protein to be separated from said material;
   retaining said protein on said dye fraction of said polymer; and
   recovering said protein from said polymer.

2. A process in accordance with claim 1 wherein said chemical bond between said monomer containing a polymerizable moiety and said organic dye is provided by a spacer arm.

3. A process in accordance with claim 2 wherein said spacer arm is an aliphatic group containing 1 to 10 carbon atoms.

4. A process in accordance with claim 3 wherein said spacer arm is a $C_1$–$C_6$ alkyl group.

5. A process in accordance with claim 1 wherein said polymer comprises not less than 0.1% by weight, based on the total weight of the polymeric composition.

6. A process in accordance with claim 1 wherein said polymer is a homopolymer obtained by the polymerization of said monomer containing said polymerizable moiety chemically bonded to said organic dye.

7. A process in accordance with claim 1 wherein said polymer is a copolymer of a first monomer containing a polymerizable moiety chemically bonded to an organic dye of the anionic type and at least one second monomer.

8. A process in accordance with claim 7 wherein said second monomer is selected from the group consisting of vinyl acetate, divinylbenzene, styrene, acrylic acid, alkyl esters of acrylic acid, methacrylic acid, alkyl esters of methacrylic acid, methacrylamide, N-(2-hydroxy-1,1-bis(hydroxymethyl)ethyl)-2-propenamide and N,N'-methylenebis(2-propenamide).

9. A process in accordance with claim 1 wherein said dye is selected from the group consisting of an azo dye, an anthriquinone dye, a formazan dye, a dioxazine dye and a phthalocyanine dye.

10. A process in accordance with claim 9 wherein said dye is Reactive Blue 2.

11. A process in accordance with claim 9 wherein said dye is Reactive Red 120.

12. A process in accordance with claim 1 wherein said polymeric composition is in divided or granular form.

13. A process in accordance with claim 12 wherein said polymeric composition includes the contents of an affinity chromatography column.

14. A process in accordance with claim 12 wherein said material is a solution, said protein is retained by said dye portion of said polymer and is recovered therefrom by filtration, decantation or centrifugation of said divided or granular polymeric composition.

15. A process in accordance with claim 1 wherein said protein is selected from the group consisting of human insulin, bovine insulin, porcine insulin, transforming growth factor, epidermal growth factor, nervous growth factor, insulin-like growth factor, interleukins, interferons, human albumin, animal albumins, follicle-stimulating hormones, luteinizing hormone, globulins and immunoglobulin.

* * * * *